(12) United States Patent
Mason et al.

(10) Patent No.: US 12,194,898 B2
(45) Date of Patent: *Jan. 14, 2025

(54) INFANT CAR SEAT

(71) Applicant: Wonderland Switzerland AG, Steinhausen (CH)

(72) Inventors: Kyle S. Mason, Lititz, PA (US); Colin F. Eggert-Crowe, King of Prussia, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,361

(22) Filed: Oct. 5, 2023

(65) Prior Publication Data

US 2024/0025310 A1 Jan. 25, 2024

Related U.S. Application Data

(63) Continuation of application No. 17/942,497, filed on Sep. 12, 2022, now Pat. No. 11,813,968, which is a continuation of application No. 16/868,640, filed on May 7, 2020, now Pat. No. 11,472,317.

(60) Provisional application No. 62/886,604, filed on Aug. 14, 2019, provisional application No. 62/846,887, filed on May 13, 2019.

(51) Int. Cl.
*A47D 15/00* (2006.01)
*A47D 13/02* (2006.01)
*B60N 2/28* (2006.01)
*B62B 9/14* (2006.01)

(52) U.S. Cl.
CPC .......... *B60N 2/2845* (2013.01); *A47D 13/02* (2013.01); *B62B 9/142* (2013.01); *B62B 2202/42* (2013.01)

(58) Field of Classification Search
CPC ....... A47D 15/00; A47D 13/02; B60N 2/2845
USPC ...................................... 297/184.13
See application file for complete search history.

(56) References Cited

U.S. PATENT DOCUMENTS

| | | | |
|---|---|---|---|
| 4,978,166 | A | 12/1990 | James |
| 4,997,231 | A | 3/1991 | Smith |
| 5,803,535 | A | 9/1998 | Cabagnero |

(Continued)

FOREIGN PATENT DOCUMENTS

| | | |
|---|---|---|
| CN | 201268326 Y | 7/2009 |
| CN | 101861263 A | 10/2010 |

(Continued)

OTHER PUBLICATIONS

First Chinese Office Action with english translation; CN Application No. 202010396004.1; Date mailed: Mar. 21, 2022; pp. 1-13.

(Continued)

*Primary Examiner* — Rodney B White
(74) *Attorney, Agent, or Firm* — CANTOR COLBURN LLP (57) ABSTRACT

An infant car seat includes a seat main body having a handle mount, a canopy unit operable to positionally cover the seat main body, and a handle mounted to the handle mount of the seat main body. The handle is rotatable relative to the handle mount about a mounting axis, and is operably connected to the canopy unit so that rotation of the handle relative to the handle mount drives the canopy unit to move relative to the seat main body.

17 Claims, 8 Drawing Sheets

(56) References Cited

U.S. PATENT DOCUMENTS

| | | |
|---|---|---|
| 6,027,163 A | 2/2000 | Longnecker |
| 6,170,910 B1 | 1/2001 | Bapst |
| 7,083,228 B1 | 8/2006 | Al Sawan |
| 7,478,877 B2 | 1/2009 | Lhomme et al. |
| 7,597,396 B2 | 10/2009 | Longenecker et al. |
| 8,070,228 B2 | 12/2011 | Karremans et al. |
| 8,474,907 B2 | 7/2013 | Weber et al. |
| 8,678,498 B2 | 3/2014 | Heisey |
| 8,882,191 B2 | 11/2014 | Phung et al. |
| 8,882,196 B2 | 11/2014 | Williams et al. |
| 9,090,181 B2 | 7/2015 | Williams et al. |
| 9,119,483 B1 | 9/2015 | Heisey |
| 9,346,378 B2 | 5/2016 | Zhang |
| 9,480,343 B2 | 11/2016 | Haut et al. |
| 9,758,068 B2 | 9/2017 | Taylor et al. |
| 10,413,085 B2 | 9/2019 | Haut |
| 10,675,548 B1 | 6/2020 | Colton |
| 11,813,968 B2 * | 11/2023 | Mason ............ B60N 2/2845 |
| 2007/0257526 A1 | 11/2007 | Hei et al. |
| 2009/0045656 A1 | 2/2009 | Chen et al. |
| 2010/0052373 A1 | 3/2010 | Kono et al. |
| 2011/0074194 A1 | 3/2011 | Weber et al. |
| 2011/0312243 A1 | 12/2011 | Schoen et al. |
| 2012/0326474 A1 | 12/2012 | Williams et al. |
| 2014/0021751 A1 | 1/2014 | Lang et al. |
| 2014/0368014 A1 | 12/2014 | Haut et al. |
| 2015/0266399 A1 | 9/2015 | Lake et al. |
| 2016/0016602 A1 | 1/2016 | D'Anastasi |
| 2016/0368400 A1 | 12/2016 | Taylor et al. |
| 2017/0240072 A1 | 8/2017 | Wright |
| 2018/0098642 A1 | 4/2018 | Williams et al. |
| 2020/0361347 A1 | 11/2020 | Mason et al. |
| 2022/0111775 A1 | 4/2022 | Xiao |
| 2024/0001819 A1 | 1/2024 | Mason et al. |

FOREIGN PATENT DOCUMENTS

| | | |
|---|---|---|
| CN | 102336153 A | 2/2012 |
| CN | 102336209 A | 2/2012 |
| CN | 102848945 A | 1/2013 |
| CN | 106256598 A | 12/2016 |
| CN | 107618406 A | 1/2018 |
| CN | 108621882 A | 10/2018 |
| EP | 1591307 B1 | 6/2014 |
| EP | 2923917 A1 | 9/2015 |
| GB | 2470801 A | 12/2010 |
| GB | 2482062 B | 1/2012 |
| GB | 2491959 A | 12/2012 |

OTHER PUBLICATIONS

First Chinese Office Action; Chinese Application No. 202010396350.X; Date: Feb. 18, 2022; 16 pages.
International Search Report for International Application No. PCT/EP2020/063370; International Filing Date: May 13, 2020; Date of Mailing: Oct. 8, 2020; 3 pages.
U.S. Appl. No. 19/868,636, filed May 7, 2020; Non-Final Office Action mailed Sep. 24, 2021; 12 pages.
U.S. Final Office Action; U.S. Appl. No. 16/868,636; Filing Date: May 7, 2020; Mailing Date: Mar. 22, 2022; 13 pages.
U.S. Non-Final Office Action; U.S. Appl. No. 16/868,640; Filing Date: May 7, 2020; Mailing Date: Mar. 3, 2022; 14 pages.
Written Opinion for International Application No. PCT/EP2020/063370; International Filing Date: May 13, 2020; Date of Mailing: Oct. 8, 2020; 7 pages.

* cited by examiner

INFANT CAR SEAT

CROSS-REFERENCE TO RELATED APPLICATIONS

This application is a continuation of U.S. patent application Ser. No. 17/942,497, filed Sep. 12, 2022, now U.S. Pat. No. 11,813,968 B2, issued Nov. 14, 2023, which is a continuation of U.S. patent application Ser. No. 16/868,640, filed May 7, 2020, now issued as U.S. Pat. No. 11,472,317, issue date Oct. 18, 2022, which claims the benefit of priority to U.S. Provisional Patent Application No. 62/846,887, filed on May 13, 2019, and U.S. Provisional Patent Application No. 62/886,604, filed on Aug. 14, 2019, all of which are incorporated by reference in their entirety herein.

FIELD

The disclosure relates to an infant car seat, and more particularly to an infant car seat with canopy.

BACKGROUND

Infant car seats are used to as safety seats for infants in motor vehicles, and are portable to be carried by hand or placed on strollers. A conventional infant car seat includes a seat unit, a carry handle that is rotatably mounted to the seat unit and that is used by an adult to carry the infant car seat, and a canopy that is also rotatably mounted to the seat unit via a pivoting bow, which can be placed in any number of positions, and that is permitted to provide shade for an infant reclining in the seat unit. Because the carry handle and the canopy usually rotate about the same axis and function independently from one another, they may interfere with one another as they rotate relative to the seat unit. In addition, it becomes difficult to return the canopy back to its usable positions once the canopy rotates beyond its functional limits.

SUMMARY

Therefore, an object of the disclosure is to provide an infant car seat that can alleviate at least one of the drawbacks of the prior art.

According to the disclosure, the infant car seat includes a seat main body that has a handle mount, a canopy unit that is operable to positionally cover the seat main body, and a handle that is mounted to the handle mount of the seat main body. The handle is rotatable relative to the handle mount about a mounting axis, and is operably connected to the canopy unit so that rotation of the handle relative to the handle mount drives the canopy unit to move relative to the seat main body.

BRIEF DESCRIPTION OF THE DRAWINGS

Other features and advantages of the disclosure will become apparent in the following detailed description of the embodiment with reference to the accompanying drawings, of which.

Part (A) of FIG. 9 is an enlarged, fragmentary sectional view of the embodiment.

Part (B) of FIG. 9 is a fragmentary front view of the embodiment.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
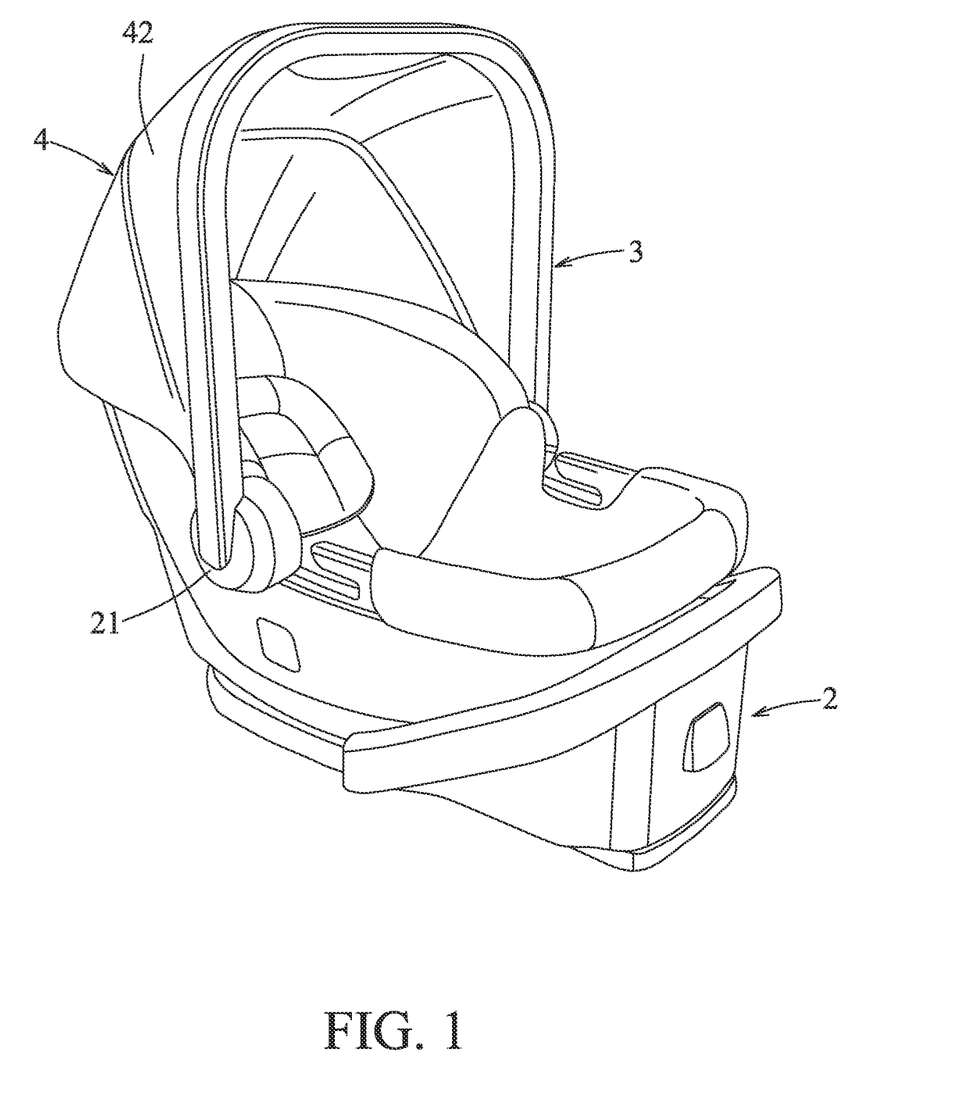
FIG. 1 is a perspective view of an embodiment of an infant car seat according to the disclosure.
Figure 3:
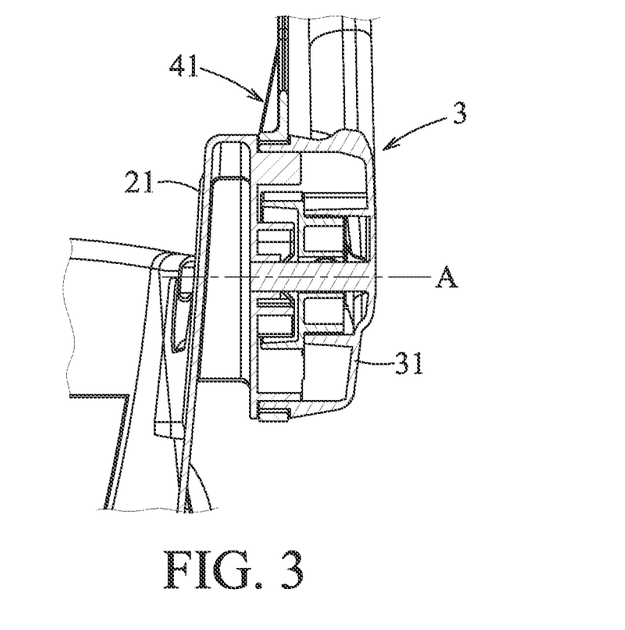
FIG. 3 is a fragmentary front sectional view of the embodiment.
Figure 8:
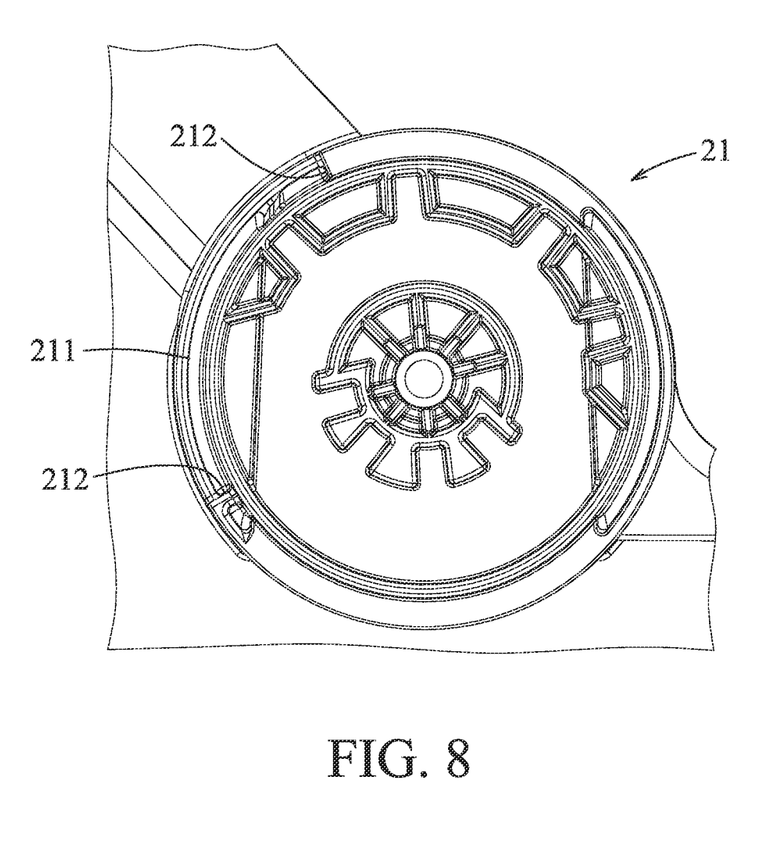
FIG. 8 is a fragmentary side view of a handle mount of a seat main body of the embodiment.

Referring to FIGS. 1, 3 and 8, an infant car seat according to the disclosure includes a seat main body 2, a handle 3, and a canopy unit 4. The seat main body 2 is for placing an infant thereon, and has two handle mounts 21 respectively disposed on two opposite sides of the seat main body 2 (only one is visible in FIG. 1). Referring specifically to FIG. 8, each of the handle mounts 21 is formed with a limiting groove 211 that extends about a mounting axis (A) and has two wall segments 212 that respectively define opposite ends of the limiting grooves 211. In one embodiment, each handle mount 21 may have only one wall segment 212 that defines one end of the limiting groove 211 thereof, and the other end of the limiting groove 211 is configured as an open end.

Figure 4:
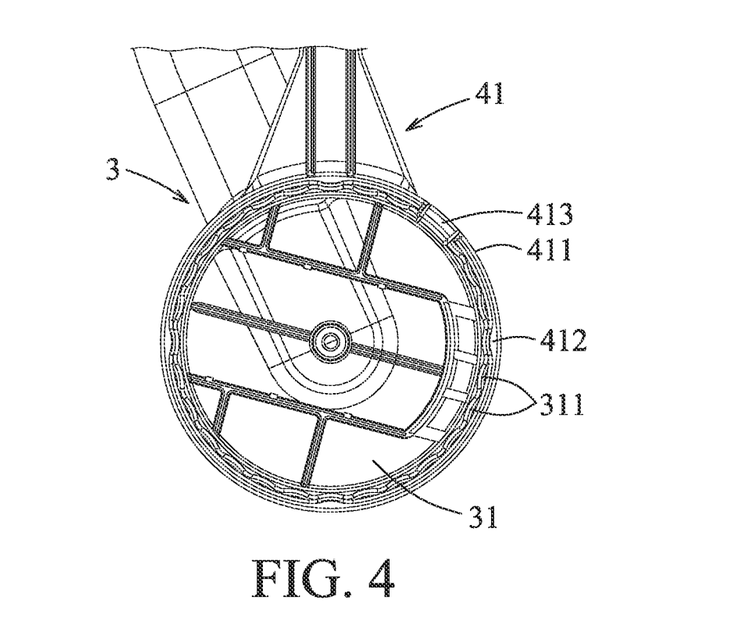
FIG. 4 is a fragmentary side sectional view of the embodiment.
Figure 5:
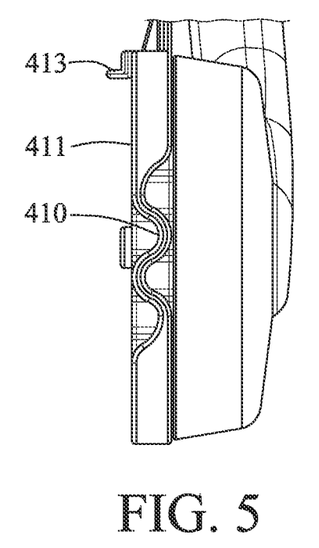
FIG. 5 is a fragmentary front view of the embodiment.
Figure 10:
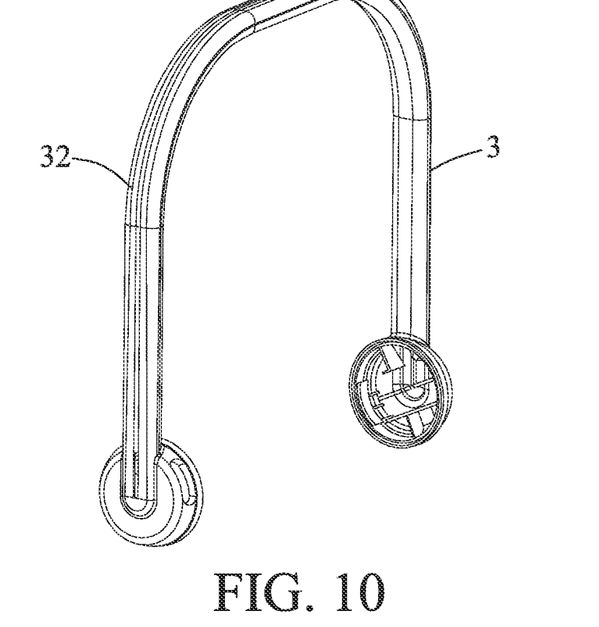
FIG. 10 is a perspective view of the handle of the embodiment.
Figure 11:
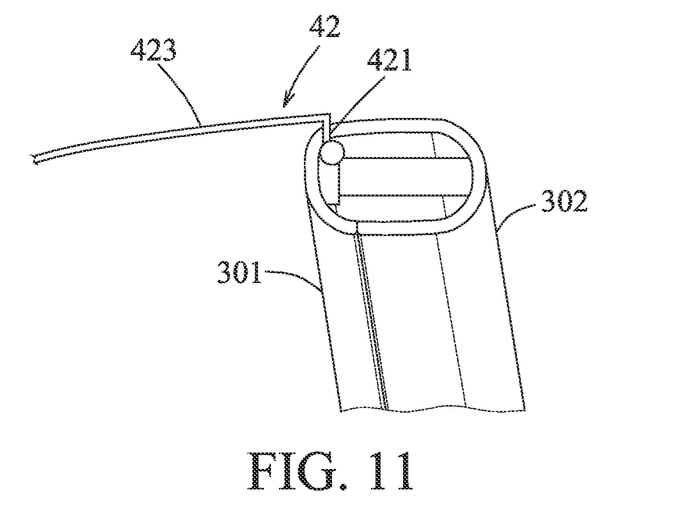
FIG. 11 is an enlarged, fragmentary cutaway perspective view of the handle of the embodiment.

Referring to FIGS. 3 and 4, the handle 3 is for carrying the infant car seat, and has two positioning ends 31 that are respectively mounted to and rotatable relative to the handle mounts 21 about the mounting axis (A). Each of the positioning ends 31 of the handle 3 is formed with a plurality of positioning grooves 311 that are disposed about the mounting axis (A). Referring to FIGS. 10 and 11, in one embodiment, the handle 3 consists of two handle halves 301, 302, with an installation groove 32 being formed at a seam between the handle halves 301, 302 and extending along the handle 3. The handle 3 is operably connected to the canopy unit 4, so that rotation of the handle 3 relative to the handle mounts 21 drives the canopy unit 4 to move relative to the seat main body 2.

Figure 2:
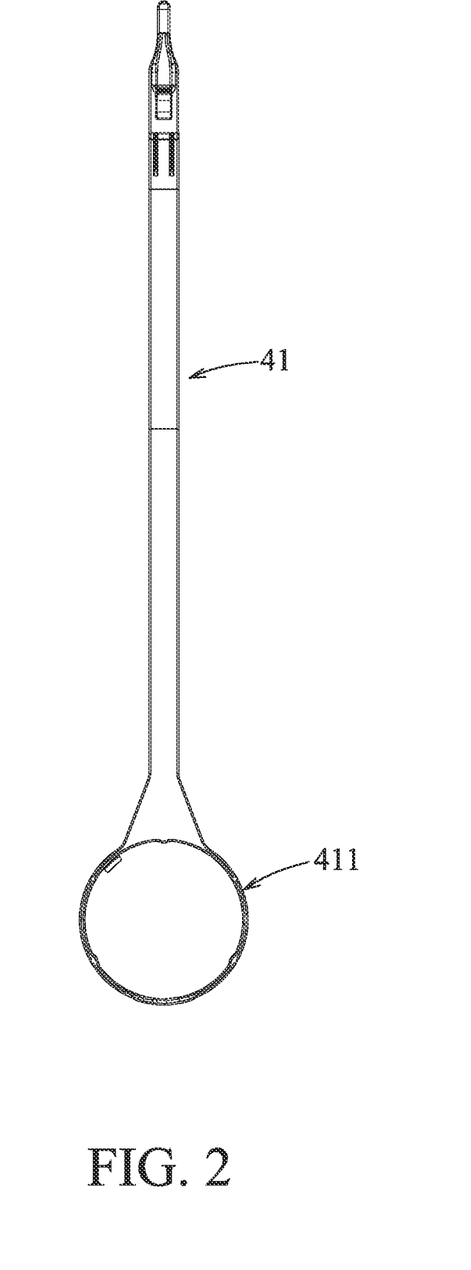
FIG. 2 is a side view of a canopy bow of a canopy unit of the embodiment.
Figure 6:
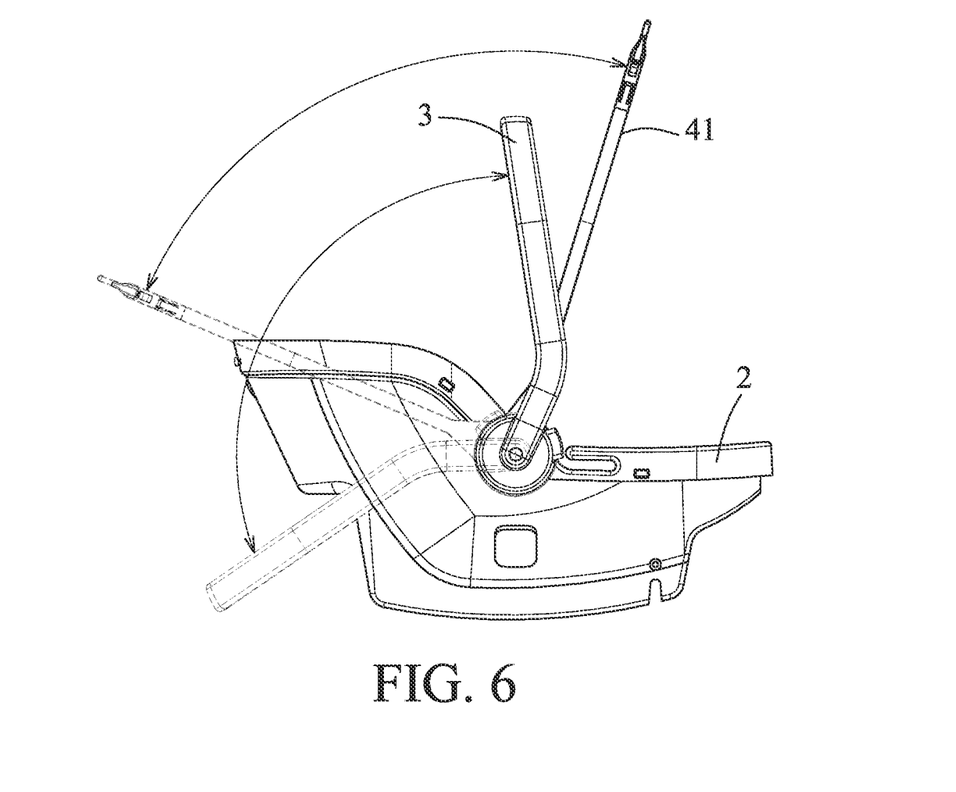
FIG. 6 is a side view of the embodiment, illustrating ranges of rotatable movement of a handle and the canopy bow of the canopy unit relative to a main body.

Referring to FIGS. 2 and 6, the canopy unit 4 includes a canopy bow 41 that is movable and able to be positioned relative to the handle 3, and a canopy 42 (with reference to FIG. 1) that is operable to positionally cover the seat main body 2.

Figure 7:
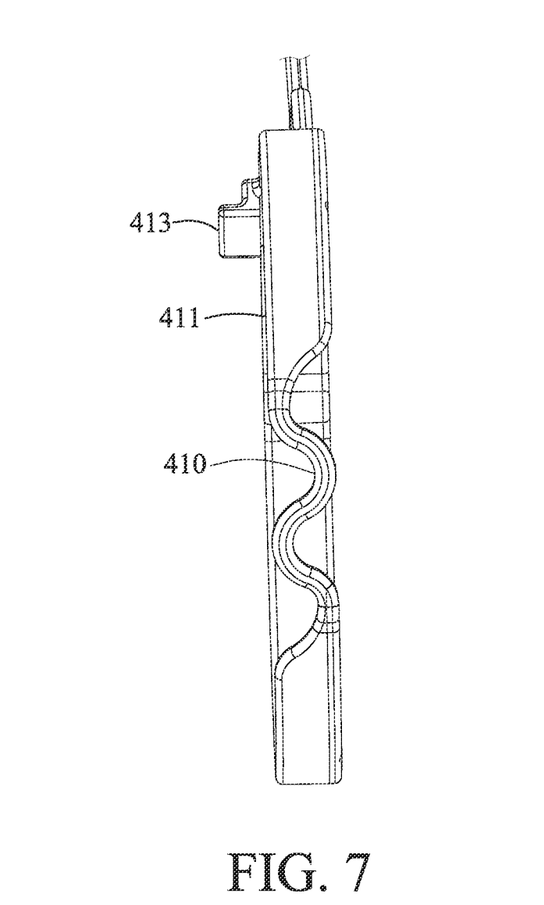
FIG. 7 is a fragmentary front view of a ring portion of the canopy bow of the embodiment.

Referring to FIGS. 2 to 5, in one embodiment, the canopy bow 41 is rotatable about the mounting axis (A) and has two ring portions 411 (only one is visible in FIG. 2), each of which surrounds the mounting axis (A), and at least one detent 412 mounted to one of the ring portions 411. Referring specifically to FIG. 7, each of the ring portions 411 has a flexible arc segment 410 that is deformable in a circumferential direction thereof. While the flexible arc segment 410 has a serpentine structure in this embodiment, it can be of any shape in a modification of the embodiment, as long as it has a cross-section smaller than that of the remaining portion of the ring portion 411. Referring specifically to FIG. 4, the detent 412 removably engages a selected one of the positioning grooves 311 of the positioning ends 31 to position the canopy bow 41 relative to the handle 3. As such, the canopy bow 41 can be positioned at different positions relative to the handle 3. As each of the ring portions 411 is deformable in a circumferential direction thereof, the detent 412 is permitted to be disengaged from the selected one of the positioning grooves 311 and to engage another one of the positioning grooves 311 when the canopy bow 41 is rotated relative to the handle 3. In other words, in order to rotate the canopy bow 41 relative to the handle 3, a user would have to pull on the flexible arc segment 410 to deform it first, so that the detent 412 is no longer locked in place and can be disengaged and re-engaged with any of the positioning grooves 311. In one embodiment, the canopy bow 41 may have a plurality of detents 412 that are mounted to the ring portions 411 and that respectively and removably engage the corresponding positioning grooves 311 of the positioning ends 31 to position the canopy bow 41 relative to the handle 3.

While the canopy bow 41 is movable and able to be positioned relative to the handle 3 via the deformation of the flexible arc segment 410 and the engagement between the positioning grooves 311 and the detent 412 in this embodiment, different types of positioning mechanisms may be employed in other embodiments, without utilizing the abovementioned elements. For example, in one embodiment, the opposite ends of the canopy bow 41 may be respectively in frictional contact with the positioning ends 31 of the handle 3. By designing either the opposite ends of the canopy bow 41 or the the positioning ends 31 with uneven, rougher surfaces, the frictional contact between the opposite ends of the canopy bow 41 and the positioning ends 31 is capable of positioning the canopy bow 41 relative to the handle 3. In another embodiment, the opposite ends of the canopy bow 41 may be respectively and magnetically coupled to the positioning ends 31 of the handle 3 for the canopy bow 41 to be positioned relative to the handle 3. In yet another embodiment, the canopy bow 41 is rotatable about the mounting axis (A), and the infant car seat may further include a latch member that is movably mounted to the seat main body 2 and that is permitted to lock the canopy bow 41 in multiple positions. In other words, the latch member separably engages both of the handle 3 and the canopy bow 41 to position the canopy bow 41 relative to the handle 3.

Figure 9:
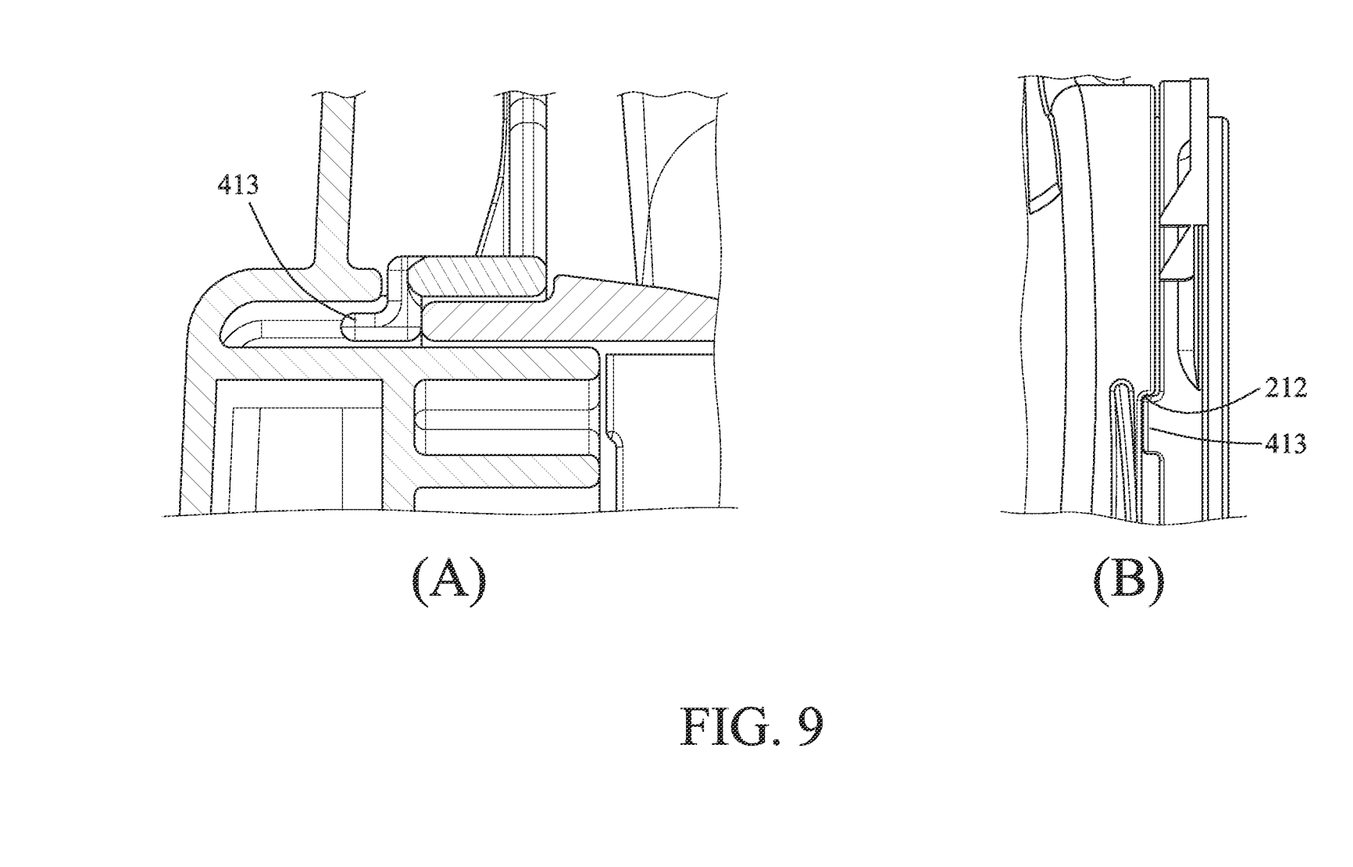

Furthermore, referring specifically to FIG. 9, each of the ring portions 411 of the canopy bow 41 further has a limiting protrusion 413. The limiting protrusion 413 is permitted to be inserted into the limiting groove 211 of a corresponding one of the handle mounts 21 of the seat main body 2, and is movable along the limiting groove 211 between the wall segments 212, so as to limit the range of rotational movement of the canopy bow 41 relative to the seat main body 2. As such, the canopy bow 41 would not rotate beyond its functional limits, ensuring that the canopy unit 4 would remain in its usable positions.

In some embodiments, the canopy bow 41 is mounted to the handle 3 instead. For example, referring to FIG. 13, in this modification of the embodiment, the canopy bow 41 is directly mounted to the handle 3 at a point (B) spaced apart from the handle mounts 21 of the seat main body 1. As a result, whenever the handle 3 rotates relative to the seat main body 2 about the mounting axis (A), the canopy bow 41 simultaneously rotates with the handle 3 about the mounting axis (A) as well.

Figure 12:
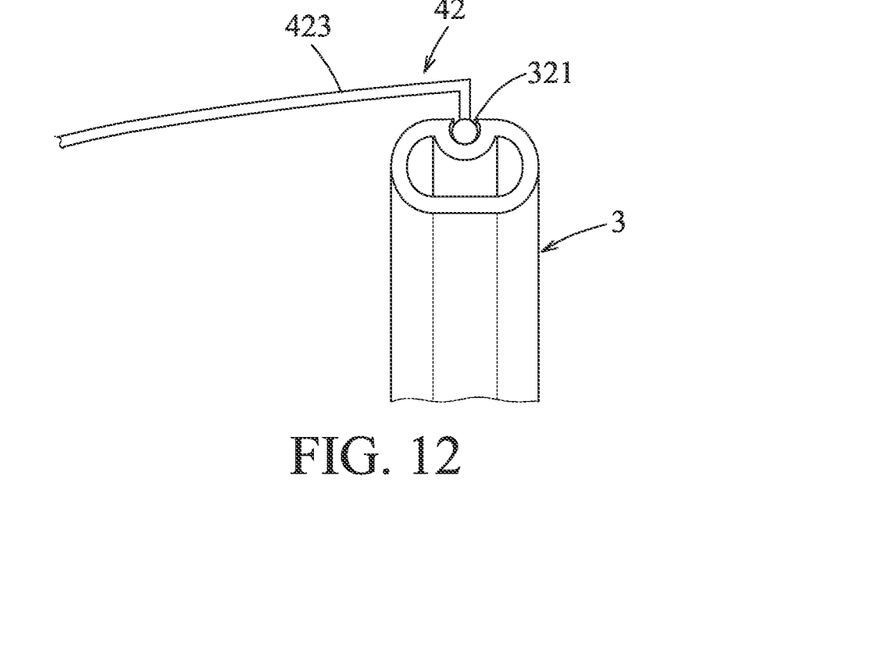
FIG. 12 is a view similar to FIG. 11, illustrating a modification to the handle of the embodiment.

Referring to FIGS. 11 and 12, the canopy 42 has opposite first and second end portions 421, 422 that are respectively connected to the handle 3 and the canopy bow 41, and a main canopy portion 423 that is connected between the first and second end portions 421, 422. Specifically, the first end portion 421 is retained within the installation groove 32 of the handle 3, and has a thickness greater than that of the main canopy portion 423. As previously mentioned, since the handle 3 consists of the two handle halves 301, 302, the first end portion 421 of the canopy may be preassembled alongside the two handle halves 301, 302 of the handle 3. Referring specifically to FIG. 12, in a modification of the embodiment in which the handle 3 is molded as a single piece, the installation groove 32 has an elongated opening 321 that has a width smaller than the thickness of the first end portion 421 of the canopy 42, and an installation opening (not shown) that is in spatial communication with the elongated opening 321 and that permits the first end portion 421 of the canopy 42 to slide therethrough to be retained within the installation groove 32 after the assembly of the handle 3. Furthermore, there are other means for connecting the first end portion 421 of the canopy 42 to the handle 3, such as utilizing snaps, buttons or straps.

Figure 13:
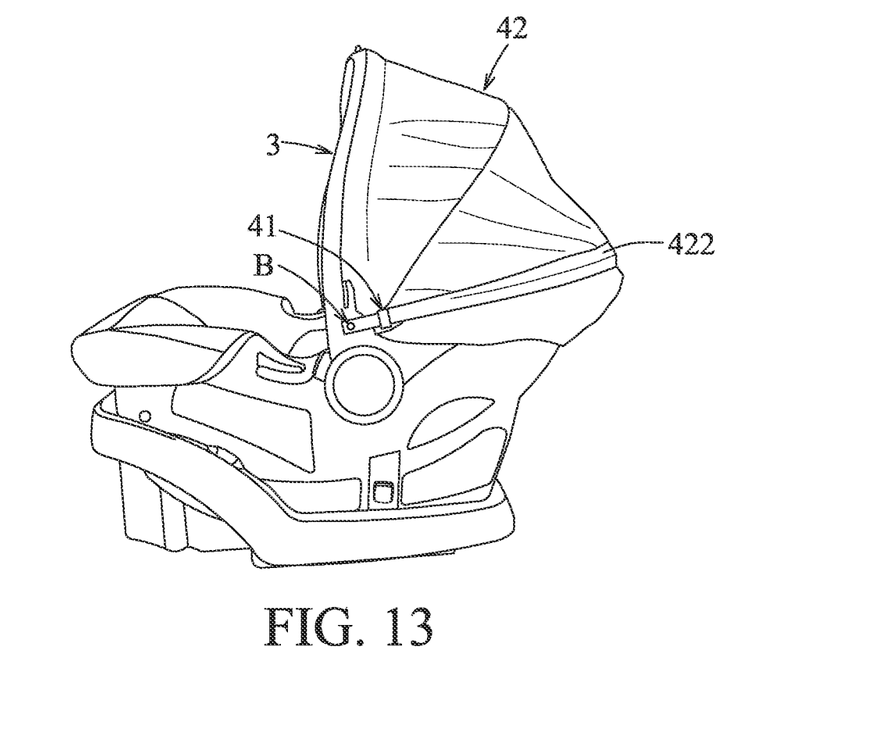
FIG. 13 is a perspective view, illustrating a modification to the canopy unit of the embodiment.

Referring to FIG. 13, in one embodiment, the canopy bow 41 may be configured such that, when the distal portion of the canopy bow 41 is located above the seat main body 2, the handle 3 is located out of the path of the rotational movement of the canopy bow, so that the handle 3 and the canopy bow 41 are configured not to interfere with each other. As such, the distal portion of the canopy bow 41 is operable to be located ahead of the handle 3 or behind the handle 3 to provide various types of shade.

In addition, while the canopy bow 41 of the canopy unit 4 is present in this embodiment, the canopy bow 41 may be omitted in other embodiments without hindering the functionality of the infant car seat (see FIG. 1). In this configuration of the embodiment, the first and second end portions 421, 422 of the canopy 42 of the canopy unit 4 are respectively connected the handle 3 and the seat main body 2 instead. The second end portion 422 may be connected to the seat main body 2 via means similar to the connection method of the first end portion 421 to the handle 3, such as utilizing snaps, buttons or straps.

Overall, the positioning mechanism established among the seat main body 2, the canopy unit 4 and the handle 3 ensures that rotation of the handle 3 relative to the handle mount 21 drives simultaneous rotation of the canopy 4 relative to the seat main body 2 as well, so that the handle 3 and the canopy unit 4 do not interfere with one another during use, and that only intentional procedure performed on the canopy unit 4 would cause the canopy unit 4 to rotate relative to the handle. In addition, if the canopy unit 4 has a canopy bow 41, the inclusion of the limiting protrusion 413 paired with the limiting groove 211 of the corresponding one of the handle mounts 21 prevents the canopy bow 41 from rotating beyond its functional limits, thereby maintaining its usability.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An infant car seat comprising:
   a seat main body including a handle mount;
   a handle mounted to said handle mount of said seat main body and rotatable relative to said handle mount about a mounting axis, said handle having an installation groove formed therein; and
   a canopy unit including a main canopy portion having a first end and a second end, said first end being receivable within said installation groove.

2. The infant car seat of claim 1, wherein a thickness of said first end is greater than a thickness of said main canopy portion.

3. The infant car seat of claim 1, wherein said handle includes a first handle portion and a second handle portion, said installation groove being formed at a seam between said first handle portion and said second handle portion.

4. The infant car seat of claim 1, wherein said installation groove has an elongated opening and an installation opening in spatial communication with said elongated opening to slidably receive said first end of said canopy unit.

5. The infant car seat of claim 4, wherein said elongated opening has a thickness smaller than a thickness of the first end.

6. The infant car seat of claim 1, wherein said second end is connectable to said seat main body.

7. The infant car seat of claim 1, wherein said canopy unit further comprises a canopy bow movable relative to said handle and seat main body.

8. The infant car seat of claim 7, wherein said canopy bow is rotatable about said mounting axis relative to said seat main body and to said handle.

9. The infant car seat of claim 7, wherein said second end is connectable to said canopy bow.

10. A canopy unit movable of an infant car seat, the infant car seat having a handle rotatable about a mounting axis, the canopy unit comprising:
    a canopy bow including a ring portion rotatably mountable about the mounting axis, wherein said canopy bow is rotatably connectable with the handle and said canopy bow is rotatable about the mounting axis relative to the handle; and
    wherein said ring portion is deformable to selectively decouple said canopy bow from the handle.

11. The canopy unit of claim 10, wherein the canopy unit further comprises at least one detent, said at least one detent being removably engageable with a positioning groove of the handle to position said canopy unit relative to the handle.

12. The canopy unit of claim 11, wherein the at least one detent is arranged at said ring portion.

13. The canopy unit of claim 11, further comprising a deformable flexible segment operably coupled to said at least one detent, wherein when said flexible segment is deformed, said at least one detent is disengaged from said positioning groove.

14. The canopy unit of claim 13, wherein said flexible segment is deformable in a circumferential direction.

15. The canopy unit of claim 13, wherein said flexible segment has a serpentine structure.

16. The canopy unit of claim 13, wherein said flexible segment is operably coupled to said ring portion.

17. The canopy unit of claim 13, wherein said flexible segment has a cross-section smaller than a remainder of said ring portion.

* * * * *